(12) United States Patent
Fischer et al.

(10) Patent No.: US 6,481,968 B1
(45) Date of Patent: Nov. 19, 2002

(54) ROTOR MAST OF A HELICOPTER

(75) Inventors: Manfred Fischer, Uhldingen-Mühlhofen (DE); Josef Müller, Salem (DE)

(73) Assignee: ZF Luftfahrttechnik GmbH, Calden (DE)

( * ) Notice: Subject to any disclaimer, the term of this patent is extended or adjusted under 35 U.S.C. 154(b) by 0 days.

(21) Appl. No.: 09/936,009

(22) PCT Filed: Mar. 4, 2000

(86) PCT No.: PCT/EP00/01921

§ 371 (c)(1), (2), (4) Date: Sep. 6, 2001

(87) PCT Pub. No.: WO00/53490

PCT Pub. Date: Sep. 14, 2000

(30) Foreign Application Priority Data

Mar. 10, 1999 (DE) ............................. 199 10 448

(51) Int. Cl.[7] ............................................. B64C 27/04
(52) U.S. Cl. ..................................................... 416/114
(58) Field of Search ............................. 416/114, 168 R

(56) References Cited

U.S. PATENT DOCUMENTS

| | | | | |
|---|---|---|---|---|
| 3,080,002 A | 3/1963 | dePont | ............... | 170/160.26 |
| 4,375,940 A | 3/1983 | Lovera et al. | ............... | 416/114 |

FOREIGN PATENT DOCUMENTS

| | | | | |
|---|---|---|---|---|
| EP | 0 250 135 A2 | 12/1987 | ............ | B64C/27/54 |
| GB | 2 295 206 A | 5/1996 | ............ | F15B/21/04 |
| JP | 59-23111 | 5/1984 | ............ | F15B/21/04 |

*Primary Examiner*—Edward K. Look
*Assistant Examiner*—Kimya N McCoy
(74) *Attorney, Agent, or Firm*—Davis & Bujold, P.L.L.C.

(57) ABSTRACT

The invention is based on a helicopter having the following features:

one rotor head (1) is non-rotatably connected with a rotor mast (3) which is rotatably mounted in a housing (5) of a transmission (6);

one or more driving mechanisms actuate the rotor mast (3) via the transmission (6) with a summarizing gear (11) fastened on said rotor mast (3), one swash plate (17) is supported by its stationary part (18) via a first fork in a non-rotatable but axially displaceable manner and tiltably in all directions relative to this axis of said rotor mast (3);

a rotatable part (19) of said swash plate (17) is rotatably supported against said stationary part (18) of said swash plate (17) via axial and radial bearings (23) and non-rotatably hinged on said rotor head (1) by means of a second fork. It is proposed that said rotor mast (3) grows funnel-shaped wider toward the housing (5) of the transmission (6), said summarizing gear (11) being flanged via a hollow stub shaft (12) on the widened end of the rotor mast (3) and the stub shaft (12) and the rotor mast (3) are rotatably supported together upon a large diameter in the housing (5). The support of the rotor mast (3) is thereby improved.

5 Claims, 1 Drawing Sheet

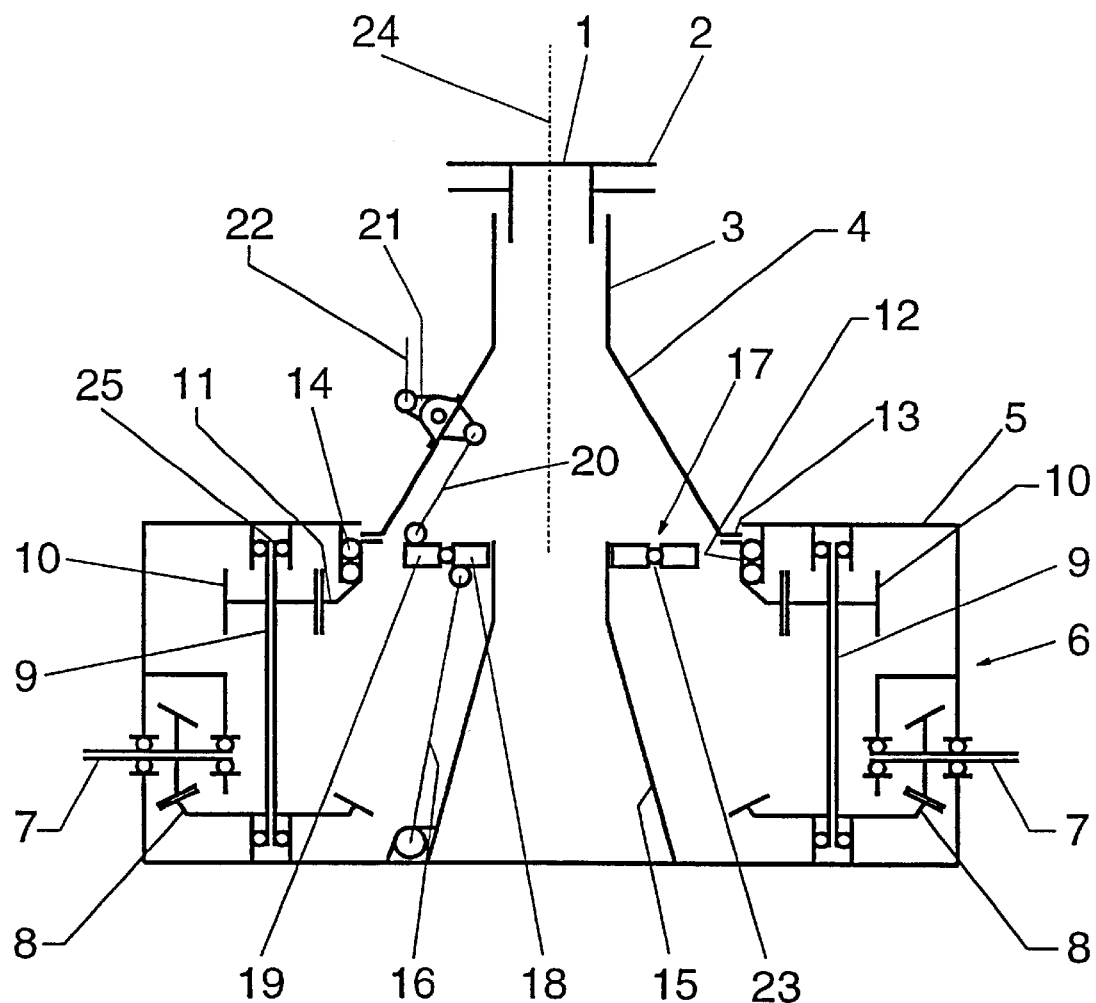

ROTOR MAST OF A HELICOPTER

BACKGROUND OF THE INVENTION

The core part of a helicopter is its main rotor. One or more driving mechanisms actuate the main rotor via one transmission and one rotor mast which is rotatably supported in the housing of the transmission and on which the rotor head is fastened.

With its two and more rotor blades, which are adjustably connected with the rotor head around the longitudinal axis thereof, the main rotor takes care not only of the lift but also of the propulsion. The rotor blades are hinged on the rotor head via a flapping hinge and a drag link or via a torsionable rod. To produce a lift, the rotor blades are adjusted collectively, that is, synchronously around an angle formed with the rotation plane. A propulsion is obtained by a cyclic control, that is, during a revolution of the rotor mast the angle of incidence of a rotor blade runs through a maximum and a minimum. The direction of flight determines the position of the extreme values.

The helicopter pilot controls the rotor blades via a swash plate. The latter consists of a stationary part which, via a so-called fork, is fastened on the housing of a transmission in a non-rotational but axially displaceable manner, and tiltably in all directions relative to the rotor mast, and of a rotatable part which is rotatably supported by radial and axial bearings against the stationary part. The rotatable part moves with the stationary part-in the axial direction, also performing at the same time tilting movements. It is fastened on the rotor head via another fork.

The movement of the swash plate is transmitted via a lever mechanism to rotor blade holding fixtures on the rotor head, and this mostly in a manner such that the angle of incidence of a rotor blade enlarges approximately with the angle of the swash plate to the rotor head.

For the flying maneuvers the helicopter pilot adjusts the swash plate via one other lever mechanism. Parallel to the latter are often mounted hydraulic servomotors which, on one hand, facilitate the control and, on the other, make a superposed control possible which counteracts the rotor blade oscillations that occur.

U.S. Pat. No. 3,080,002 has disclosed a helicopter drive mechanism on which a rotor mast is rotatably supported in a transmission housing, specifically on the outer periphery thereof, directly on the transmission housing and on an inner cavity on a supporting column firmly- connected with the transmission housing. On the outer periphery of the rotor mast, a driving gear wheel is connected with positive fit with the rotor mast which is actuated, via a pinion, by a driving mechanism of the helicopter. A swash plate is situated above the rotor mast and the rotor head and is operated by actuators which are passed through the supporting column and the rotor mast.

The invention is based on the problem of better supporting the rotor mast in the transmission housing in a helicopter of the above mentioned kind and more conveniently introducing the forces from the transmission in the rotor mast. According to the invention this problem is solved by the features of claim 1.

SUMMARY OF THE INVENTION

According to the invention the rotor mast grows wider in funnel shape toward the housing of the transmission, the summarizing gear being flanged via a hollow stub shaft on the widened end of the rotor mast and the stub shaft and the rotor mast being together rotatably supported on a large diameter in the housing.

The funnel-shaped widening of the rotor mast reduces the stresses with increasing diameter so that the connection between the stub shaft or the summarizing gear and the rotor mast, which lies on a large diameter, is loaded with only very slight stresses. In addition, the driving and supporting forces are introduced in the transmission housing on the shortest path. Deformations in the meshing of gears are thereby extensively prevented. Besides, the number of parts becomes reduced due to the common support for the rotor mast and the summarizing gear.

Installation space is gained by virtue of the funnel-shaped widening of the rotor mast and the large supporting diameter, for ex., within the common bearing, in order to integrate the swash plate in the transmission housing. The swash plate can thus be supplied by the transmission lubrication and is protected against pollution from the outside.

In helicopters, where the rotor blades are fastened by flapping hinges and drag links on the rotor mast, the control rods engaging in the rotatable part of the swash plate can be guided by the rotor mast and the rotor head and engage in the rocking levers for the rotor blades which are rotatably supported in the rotor head. The control parts are thus altogether protected and the air flow is not impaired by outer control rods.

In helicopters where the rotor blades are fastened without flapping and drag hinges only via a torsionable rod on the rotor mast, it is required that the control rods extend outside the rotor mast. In order to protect the swash plate against weather influences and supply it by means of the transmission lubrication, according to an embodiment of the invention, the rod for control of the rotor blades is outwardly guided through the casing of the funnel-shaped part of the rotor mast by the rotatable part of the swash plate integrated in the transmission, the rod conveniently containing a shift lever supported on the rotor mast and flexibly connecting inner control rods with outer control rods.

In the specification and in the claims numerous features are shown and described in association. The expert will separately observe the combined features conveniently according to the problems to be solved and will form with them added logical combinations.

BRIEF DESCRIPTION OF THE DRAWING

The invention will now be described, by way of example with reference to the accompanying drawing in which:

FIG. 1 shows a diagrammatic longitudinal section through a rotor mast and an attached transmission.

DETAILED DESCRIPTION OF THE INVENTION

With a rotor head 1 of the main rotor of a helicopter, rotor blades 2 are adjustably connected around the longitudinal axis thereof. There are controlled via a swash plate 17 and a control rod, which contains inner controls rods 20 and outer control rods 22 which are pivotably interconnected via a shift lever 21 supported on a rotor mast 3. Distributed on the periphery several control rods 20, 21, 22 are provided. The inner control rods 20 engage on a rotatable part 19 of the swash plate 17 which is connected with the rotor mast 3 via a second fork (not shown).

The rotatable part 19 of the swash plate 17 is supported by means of a radial and axial bearing 23 on the stationary part 18 of the swash plate 17. The latter is connected via a first fork (not shown) with a bracing tube 15 in a non-rotatable but axially displaceable manner and tiltably in relation to the axis of rotation 24 of the rotor mast 3. The bracing tube 15 is firmly connected with a housing 5 of a transmission 6. At least three actuators 16 distributed on the periphery determine the axial position and the inclination of the swash plate 17.

Driving mechanisms (not shown in detail) actuate, via input shafts 7 and the transmission 6, the rotor mast 3 which is non-rotatably connected with the rotor head 1. The transmission 6 has for each driving mechanism one bevel gear step 8 which drives a spur gear 10 via an intermediate shaft 9. The intermediate shaft 9 extends parallel to the axis of rotation 24 so that the spur gears 10 mesh with a summarizing gear 11 which is also configured as spur gear and thus can easily transmit large torques. The rotational speeds of the dirving mechanisms of over 6000 rpm are reduced by the transmission 6 to rotational speeds of the rotor mast 3 of about 400 U/min.

On the summarizing gear 11 is integrated a stub shaft 12 which is flanged on a flange 13 of the rotor mast 3. The stub shaft 12 is supported by a bearing 14 on a large diameter in the housing 5 of the transmission 6. The summarizing gear 11 and the rotor mast 3, which has a funnel-shaped part 4 that grows larger toward the transmission 6, are thus supported by a common bearing 14. As result of the large diameter, the stresses in the area of the flange 13, the same as the specific bearing forces of the bearing 14, are slight. By a bearing 25 of the intermediate shaft 9 with the spur gear 10, a good gear engagement of the spur gear 10 in the summarizing gear 11 and only slight deformations under load, thereby result.

REFERENCE NUMERALS 1 rotor head
2 rotor blade
3 rotor mast
4 funnel-shaped part
5 housing
6 transmission
7 input shaft
8 bevel gear step
9 intermediate shaft
10 spur gear
11 summarizing gear
12 stub shaft
13 flange
14 bearing
15 bearing tube
16 actuator
17 swash plate
18 stationary part
19 rotatable part
20 inner control rod
21 shift lever
22 outer control rod
23 radial and axial bearing
24 axis of rotation
25 bearing

What is claimed is:

1. A helicopter having the following features:
   a rotor head (1) non-rotatably connected with a rotor mast (3), defining an axis, which is rotatably mounted in a housing (5) of a transmission (6);
   at least one driving mechanisms to actuate the rotor mast (3) via the transmission (6) with a summarizing gear (11) fastened on said rotor mast (3);
   one swash plate (17) supported by a stationary part (18) thereof via a first fork in a non-rotatable but axially and tiltably displaceable manner in all directions relative to said axis of said rotor mast (3);
   a rotatable part (19) of said swash plate (17) is rotatably supported against said stationary part (18) of said swash plate (17) via axial and radial bearings (23) and non-rotatably hinged on said rotor head (1) by means of a second fork; wherein
   said rotor mast (3) increases funnel-shaped wider toward said housing (5) of said transmission (6), said summarizing gear (11) being flanged via a hollow stub shaft (12) on the widened end of said rotor mast (3) and said stub shaft (12) and said rotor mast (3) are rotatably supported together upon a large diameter in said housing (5);
   wherein said swash plate (17) is integrated in an installation space of the transmission housing (5).

2. The helicopter according to claim 1, wherein said swash plate is lubricated by transmission lubricant.

3. The helicopter according to claim 2, wherein said swash plate (17) on said transmission (6) is situated in the area of said hollow stub shaft (12).

4. The helicopter according to claim 2, wherein for control of said rotor blades (2) said rod (20, 21, 22) is passed outwardly from said rotatable part (19) of said swash plate (17) through the casing of said funnel-shaped part (4) of said rotor mast (3).

5. The helicopter according to claim 4, wherein said rod (20, 21, 22) contains a shift lever (21) supported on said rotor mast (3).

* * * * *